F. L. W. BUCKMANN.
CUTTING AND ROUNDING OFF MACHINE FOR TEETH FOR CLOCKWORK.
APPLICATION FILED SEPT. 5, 1918.

1,341,541.

Patented May 25, 1920.
3 SHEETS—SHEET 2.

INVENTOR
Frederik Louis Willem Buckmann
By Munn & Co
Attorney

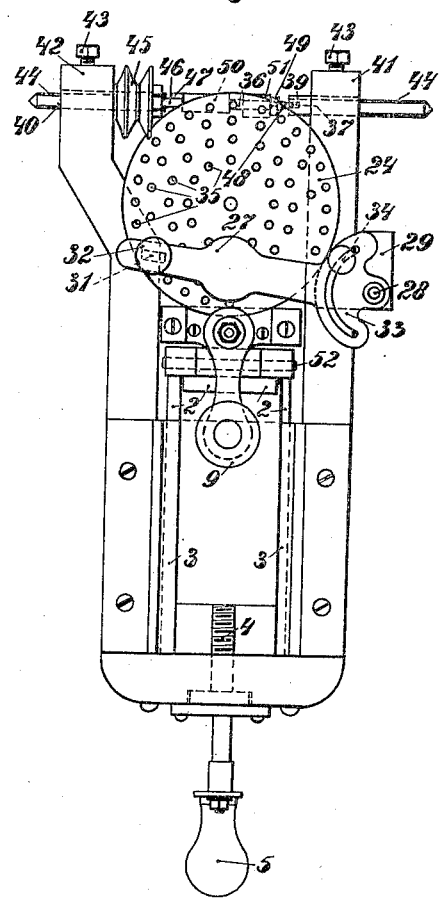

UNITED STATES PATENT OFFICE.

FREDERIK LOUIS WILLEM BUCKMANN, OF AMSTERDAM, NETHERLANDS.

CUTTING AND ROUNDING-OFF MACHINE FOR TEETH FOR CLOCKWORK.

1,341,541.  Specification of Letters Patent.  Patented May 25, 1920.

Application filed September 5, 1918. Serial No. 252,797.

*To all whom it may concern:*

Be it known that I, FREDERIK LOUIS WILLEM BUCKMANN, mechanician, a subject of the Queen of the Netherlands, residing at Amsterdam, in the Province of North Holland, in the Kingdom of the Netherlands, have invented certain new and useful Improvements in Cutting and Rounding-Off Machines for Teeth for Clockwork, of which the following is a specification.

The invention relates to a machine for cutting and rounding off teeth on spur and bevel toothed wheels and pinions for the clock work and instrument makers' trade, and has for its purpose to make this machine of a very simple and compact construction in order that it can be easily handled and can be of great convenience and advantage in the clockwork makers' and instrument makers' trade.

The invention consists in certain novel features of construction and arrangement of parts hereinafter fully described and pointed out in the claims.

The drawings are as follows:

Fig. 4 is a side view taken from the right of Fig. 1.

Figure 1:
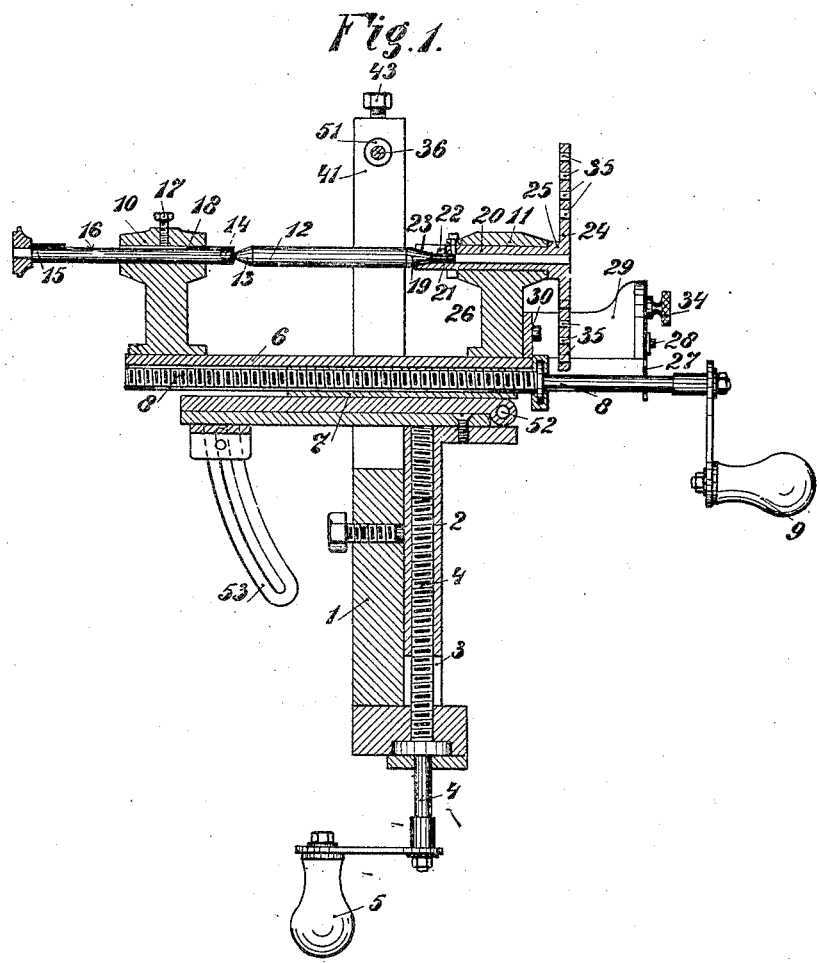
Figure 1 is a vertical cross section of the machine.
Figure 2:
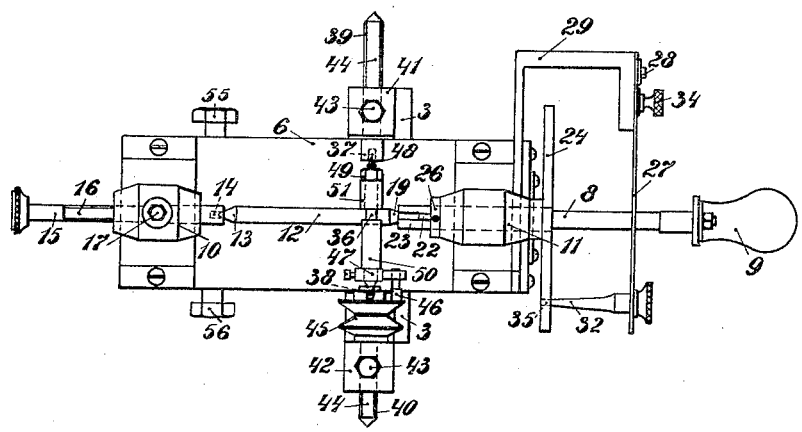
Fig. 2 is a plan.
Figure 3:
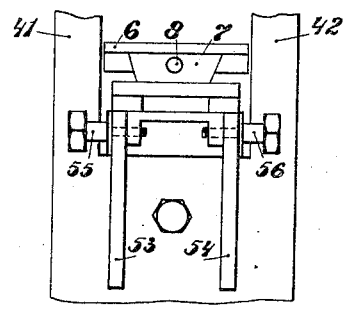
Fig. 3 is a partial side view taken from the left of Fig. 1.

It should be mentioned that the drawings do not show in detail how the machine is fixed to a vise or to a frame. A support 2, arranged in a U-shaped frame 1, can be moved vertically up and down in a dove-tail guide 3 by means of a screw 4 with hand crank 5. The support 2 carries between the legs of the U-shaped frame a slide 6 which can be moved horizontally backward and forward over a dove-tail guide 7, forming part of the support 2, by means of a screw 8 with hand crank 9. This motion is perpendicular to the guide 3. The slide 6 carries two fixed heads 10 and 11 and these heads support the spindle 12 on which the work, *i. e.*, one or more round disks in which teeth have to be cut, is fixed.

The spindle 12 rests with one conical end 13 in a center hole 14 at the end of a spindle 15 movable through the fixed head 10. This spindle 15 is provided with a filed or planed flat surface 16, against which the flat end of a clamping screw 17 can be screwed in order to fix the spindle in place. The spindle 15 cannot furthermore be drawn out and cannot fall out sidewise on slightly loosening the screw as the end of the screw 17 offers an obstruction to the shoulder 18 of the flat surface 16. Only on loosening the screw 17 further can the spindle 15 be wholly drawn out. The other end 19 of the spindle 12 for the work is also conical and is centered in a conical boring of a bush 20 which can turn in the fixed head 11. In order to prevent rotation of the spindle 12 relatively to the bush 20 a cylindrical extension piece 21 with a projection 22 is provided on the outer end 19 of the spindle. This projection fits in a groove or slot 23 in the bush 20. The bush 20 is provided at the other end with an indexing disk 24 which lies with its boss 25 against the fixed head 11. The bush 20 is locked in the fixed head 11 by means of a ring 26. The indexing disk 24 works in conjunction with an adjustable arm 27. This arm has its point of rotation on a bracket 29 fixed at the point 30 on the fixed head 11. This arm 27 is provided at its free end with a slot 31 in which a set pin 32 is placed. This set pin is adjustable with respect to the arm 27 so that the pin can always be inserted accurately in the indexing disk. This is of importance for resetting the wheel to be cut. The arm 27 has moreover a broadened part 33 in which a sector slot is cut, the center of which lies at the point of rotation 28. The arm can be fixed at different angles by means of a clamping screw 34 which is inserted through the slot and screws into the bracket 29, whereby the set pin 32 is made to slide into one of the holes 35 in the indexing disk. These holes are arranged to correspond with the number of teeth which are required on the toothed wheel to be cut. The insertion of the pin is, with the construction shown, assured in a simple manner by making the arm 27 in the form of a spring so that the pin 32 is held pressed in the holes by spring pressure.

Above the spindle 12 for carrying the work there is a horizontal spindle 36 for carrying the tool, for example a milling cutter, and this spindle 36 is arranged with its axis perpendicular to the axis of the spindle 12.

The spindle 36 is supported so that it can turn in holes 37, 38 in the inner ends of centering spindles 39 and 40 which can be adjusted and fixed in the upper ends of the legs 41 and 42 of the U-shaped framework 1. This is carried out by means of clamping screws 43 working in conjunction with the flat surfaces 44 on the centering spindles. The centering spindle 40 forms moreover the spindle for a driving pulley 45 which is loose on the spindle and serves to drive the tool spindle 36, for which purpose it is provided with a driving pin 46 which drives a carrier 47 on the spindle 36. The spindle 36 is provided at one end with a screw thread 48 with corresponding nut 49 by means of which the milling cutter can be clamped. The cutter is clamped between an enlarged portion 50 of the spindle 36 and a locking sleeve 51. In order to cut the teeth of bevel toothed wheels as well as those of spur toothed wheels the guide 7 of the slide 6 is arranged to turn around an axle 52, pivoted in the support 2. The slide can thus be fixed at different angles, in other words the work spindle 12 can cross the tool spindle at different angles corresponding to the required bevel of the teeth. In order to fix the guide with slide and accessories in the different angular positions the guide is provided at the end opposite the hinge 52 at both sides with two guide links 53 and 54, the center of which is at the hinge 52. Clamping screws 55 and 56 pass through these links and screw into the support.

The operation of the machine is as follows:

The necessary milling cutter is arranged on the tool spindle and is accurately fixed in one known way or another with its plane in the vertical plane through the axis of the work spindle 12. One or more disks in which the teeth have to be cut, are placed on the work spindle. The work spindle 12 is adjusted to the required height by means of the hand crank 5. The milling cutter is now rotated rapidly by the aid of the driving pulley 44 and the work slowly moved forward in a horizontal direction by means of the crank 9. The cutter has thus an opportunity of cutting away locally the material of the disks on the work spindle 12. A slot is thus cut in all the disks placed next to each other on the work spindle. After this the pin 32 is brought out of contact with the indexing disk 24 and after the indexing disk has been turned through a certain angle the pin is placed in a following hole corresponding to the number of teeth which are required to be cut in the work. In this manner the process is continued until all the teeth have been cut.

For the milling of bevel wheels the process is the same, with however the exception that the slide 6 must first be brought into the required angular position.

What I claim is:

1. A machine of the character described, comprising a U-shaped frame, a support vertically adjustable on the frame, a hinged and adjustable guideway carried by the support and extending between the members of the frame, an adjustable slide mounted in the guideway and having spaced heads, a work carrying spindle mounted between the said heads, a revoluble tool carrying spindle mounted between the upper ends of the members of the frame, said spindle being above and at right angles to the work carrying spindle, an indexing member operatively connected with the work carrying spindle, and an adjustable member adapted to engage the indexing member.

2. A machine of the character described, comprising a U-shaped frame, a support vertically adjustable on the frame, a hinged and adjustable guideway carried by the support and extending between the members of the frame, an adjustable slide mounted in the guideway and having spaced heads, bearing members in the heads, one of the members being mounted to turn, a work carrying spindle mounted in said bearing members, bearing members mounted in the upper ends of the members of the frame, a revoluble tool carrying spindle mounted in the said members, an apertured indexing disk on one of the bearing members of the work carrying spindle, and an adjustable and spring pressed pin for engaging the apertures of the disk.

In testimony whereof I have hereunto set my hand.

FREDERIK LOUIS WILLEM BUCKMANN.